US009098488B2

(12) United States Patent
Hamid et al.

(10) Patent No.: US 9,098,488 B2
(45) Date of Patent: Aug. 4, 2015

(54) TRANSLATION OF MULTILINGUAL EMBEDDED PHRASES

(75) Inventors: Ahmed Abdul Hamid, Cairo (EG); Kareem Darwish, Doha (QA)

(73) Assignee: Microsoft Technology Licensing, LLC, Redmond, WA (US)

( * ) Notice: Subject to any disclaimer, the term of this patent is extended or adjusted under 35 U.S.C. 154(b) by 699 days.

(21) Appl. No.: 13/078,987

(22) Filed: Apr. 3, 2011

(65) Prior Publication Data

US 2012/0253785 A1 Oct. 4, 2012

(51) Int. Cl.
*G06F 17/28* (2006.01)
*G06F 17/27* (2006.01)
*G06F 17/22* (2006.01)

(52) U.S. Cl.
CPC .......... *G06F 17/275* (2013.01); *G06F 17/2229* (2013.01); *G06F 17/289* (2013.01)

(58) Field of Classification Search
CPC ....................................................... G06F 17/28
USPC ................................................. 704/2, 4, 9, 8
See application file for complete search history.

(56) References Cited

U.S. PATENT DOCUMENTS

| 5,805,832 | A * | 9/1998 | Brown et al. ...................... 711/1 |
| 6,658,627 | B1 | 12/2003 | Gallup et al. |
| 7,752,034 | B2 | 7/2010 | Brockett et al. |
| 2007/0282590 | A1 | 12/2007 | Suzuki et al. |
| 2009/0083028 | A1* | 3/2009 | Davtchev et al. ................. 704/9 |
| 2012/0035914 | A1* | 2/2012 | Brun ................................. 704/9 |

OTHER PUBLICATIONS

Cheung, Percy, and Pascale Fung. "Translation disambiguation in mixed language queries." Machine translation 18.4 (2004): 251-273.*
Sinha, R. Mahesh K., and Anil Thakur. "Machine translation of bi-lingual hindi-english (hinglish) text." 10th Machine Translation summit (MT Summit X), Phuket, Thailand (2005): 149-156.*
Gimpel, Kevin, and Noah A. Smith. "Rich source-side context for statistical machine translation." Proceedings of the Third Workshop on Statistical Machine Translation. Association for Computational Linguistics, 2008.*
Basili, et al., "Web-based information access: Multilingual Automatic Authoring", (Available for download on Jan. 25, 2011) from <<http://ieeexplore.ieee.org/stamp/stamp.jsp?tp=&arnumber=1000446>> In the Proceedings of the International Conference on Information Technology: Coding and Computing, Apr. 8-10, 2002, 6 pages.

(Continued)

*Primary Examiner* — Vincent P Harper
(74) *Attorney, Agent, or Firm* — Judy Yee; Sandy Swain; Micky Minhas

(57) ABSTRACT

A communication object including a plurality of object words may be received. The communication object may be parsed to identify each of the object words as tokens. A first natural language and at least one natural language different from the first natural language that are associated with the plurality of object words may be determined, based on a language analysis of the tokens. Tokens associated with the first natural language and tokens included in embedded word phrases associated with the embedded natural language may be translated, via a translating device processor, to a target natural language, based on at least one context associated with the communication object.

20 Claims, 13 Drawing Sheets

(56) References Cited

OTHER PUBLICATIONS

Brun, et al., "Document Structure and Multilingual Authoring", (Available for download on Jan. 25, 2011) from <<http://delivery.acm.org/10.1145/1120000/1118258/p24-brun.pdf?key1=1118258&key2=8310495921&coll=DL&dl=ACM&CFID=6679844&CFTOKEN=20106857>> Proceedings of the First International Conference on Natural Language Generation—vol. 14, MITZP, 2000, pp. 24-31.

"Classification in machine learning", (Available for download on Apr. 3, 2011) from <<http://en.wikipedia.org/wiki/Classification_in_machine_learning>> From Wikipedia, the free encyclopedia, 3 pages.

Hartley, et al., "Multilingual Document Production from Support for Translating to Support for Authoring", (Available for download on Jan. 25, 2011) from <<http://citeseerx.ist.psu.edu/viewdoc/download?doi=10.1.1.31.8896&rep=rep1&type=pdf>> 1996, pp. 1-24.

Koehn, et al., "Moses: Open Source Toolkit for Statistical Machine Translation," in Annual Meeting of the Association for Computational Linguistics (ACL), demonstration session, Prague, Czech Republic, Jun. 2007, pp. 177-180.

"Language Modeling and Probability" (Available for download on Feb. 17, 2011) from <<http://cog.brown.edu/~mj/classes/cg136/handouts/langmond.pdf>>, 2009, 30 pages.

Marcu, et al., "A Phrase-Based, Joint Probability Model for Statistical Machine Translation" (Available for download on Apr. 3, 2011) from <<http://delivery.acm.org/10.1145/1120000/1118711/p133-marcu.pdf?key1=1118711&key2=2309081031&coll=DL&dl=ACM&ip=70.179.120.120&CFID=14732338&CFTOKEN=92941897>> , in Proceedings of the Conference on Empirical Methods in Natural Language Processing (EMNLP), Philadelphia, Jul. 2002, pp. 133-139.

Pazienza, et al., "Multilingual Authoring: the NAMIC approach", (Available for download on Jan. 25, 2011) from <<http://acl.ldc.upenn.edu/W/W01/W01-1013.pdf>> In the proceedings of the workshop on Human Language Technology and Knowledge Management, 2001, 8 pages.

Tait, et al., "MABLe: a Multi-lingual Authoring Tool for Business Letters", (Available for download on Jan. 25, 2011) from <<http://www.mt-archive.info/Aslib-1999-Tait.pdf>> , In the Proceedings of Translating and the Computer 21, Nov. 10-11, 1999, 12 pages.

\* cited by examiner

200b (2A)

↓

- - - - - - - - - - - - - - - - - - - - - - - - - - - 212
| Recognize each of the plurality of object words as a token |
- - - - - - - - - - - - - - - - - - - - - - - - - - -

↓

- - - - - - - - - - - - - - - - - - - - - - - - - - - 214
| Identify a determined natural language associated with each recognized word |
- - - - - - - - - - - - - - - - - - - - - - - - - - -

(2B)

↓

- - - - - - - - - - - - - - - - - - - - - - - - - - - 216
| Determine a translation model probability associated with a candidate |
| translational phrase, based on a frequency of occurrence value associated |
| with the candidate translational phrase |
- - - - - - - - - - - - - - - - - - - - - - - - - - -

↓

- - - - - - - - - - - - - - - - - - - - - - - - - - - 218
| Determine a language model probability associated with the candidate |
| translational phrase, based on a predictive value associated with a sequential |
| word context associated with a language model |
- - - - - - - - - - - - - - - - - - - - - - - - - - -

↓

- - - - - - - - - - - - - - - - - - - - - - - - - - - 220
| Translate, via the translating device processor, the at least one embedded |
| word phrase to the target natural language, based on combining the |
| translation model probability value and the language model probability value |
| that are associated with candidate translational phrases associated with the |
| communication object |
- - - - - - - - - - - - - - - - - - - - - - - - - - -

222 — Determine a length of a candidate translation of a group of the object words 224 — Determine a difference between a length of a phrase of object words associated with the at least one embedded natural language and a length of a phrase associated with the target natural language that corresponds to a candidate translation of the phrase of object words 226 — Translate the embedded word phrases to the target natural language, based on at least one of the length of the candidate translation of the group of the object words, and the difference between the length of the phrase of object words associated with the at least one embedded natural language and the length of the phrase associated with the target natural language that corresponds to the candidate translation of the phrase of object words (2D)

228 — Translate, via the translating device processor, the at least one embedded word phrase to the target natural language, based on one of an arithmetic product of the translation model probability value and the language model probability value, and an arithmetic sum of the log of the translation model probability value and log of the language model probability value

316 — Translate the tokens associated with the first natural language and the tokens included in embedded word phrases associated with the at least one embedded natural language to a target sequence of words associated with a target natural language, based on at least one translation function of attributes associated with candidate translational phrases associated with the communication object (3B)

318 — Translate the tokens associated with the first natural language and the tokens included in embedded word phrases associated with the at least one embedded natural language to the target sequence of words associated with the target natural language, based on at least one of combining a translation model probability value and a language model probability value that are associated with candidate translational phrases associated with the communication object, a length of a candidate translation of the group of the object words, and a difference between a length of a phrase of object words associated with one of the at least one embedded natural language and a length of a phrase associated with the target natural language that corresponds to a candidate translation of the phrase of object words

┌─────────────────────────────────────────────────────────────────────┐
│ Translating the tokens includes translating, via the translating device │
│ processor, the tokens associated with the first natural language and the │    414
│ tokens included in embedded word phrases associated with the at least one │
│ embedded natural language to a target natural language object, based on at │
│ least one translation function of attributes associated with candidate │
│ translational phrases associated with the communication object to generate a │
│ ranked list of candidate translation phrases │
└─────────────────────────────────────────────────────────────────────┘

(4B)

┌─────────────────────────────────────────────────────────────────────┐
│ Translating the tokens includes translating, via the translating device │
│ processor, the tokens associated with the first natural language and the │
│ tokens included in the at least one embedded word phrase associated with │
│ the at least one embedded natural language to the target natural language │    416
│ object, based on at least one of multiplying a translation model probability │
│ value by a language model probability value that are each associated with the │
│ communication object, determining a length of a translation, and determining │
│ a difference between a length of a phrase of object words associated with the │
│ at least one embedded natural language and a length of a phrase associated │
│ with the target natural language that corresponds to a candidate translation of │
│ the phrase of object words │
└─────────────────────────────────────────────────────────────────────┘

FIG. 4b

TRANSLATION OF MULTILINGUAL EMBEDDED PHRASES

BACKGROUND

Machine translation of text from one natural language to another has become a routine functionality that may be used many times each day by users of devices such as desktop computers, personal computers and hand-held devices such as mobile phones. In the ever-growing global marketplace, vendors and developers may communicate regularly with customers and employers who speak different languages, and machine translation systems may aid in converting a communication document from the native natural language of its author to one or more target natural languages of its intended recipients.

Many languages include an alphabet associated with a script that may cause difficulties for users in finding appropriate keyboards to support typing messages or documents. If keyboards supporting such alphabets/scripts are commercially available, potential users frequently do not have easy access to purchase or use them. Transliterated text may thus be typed into a document using a keyboard that is available to a user (e.g., an available English keyboard may be used to type in transliterated Arabic characters), and the user may then communicate by either sending the transliterated text to intended recipients, or may employ a transliteration engine to convert the transliterated text into characters that may be recognized as alphabetic characters of the source language. Thus, for example, if a native speaker of Arabic can only type sufficiently fast using an English keyboard, he/she may be able to type messages or documents as transliterated Arabic text on an English keyboard, and request that the entire message or document be converted to Arabic.

SUMMARY

According to one general aspect, a multilingual translator engine may include a receiving engine configured to receive a communication object including a plurality of object words arranged in sequence. The multilingual translator engine may also include a language determination engine configured to determine a first natural language and at least one embedded natural language different from the first natural language associated with the communication object, based on at least one first language word phrase associated with the first natural language and at least one embedded word phrase associated with the embedded natural languages that are included in the plurality of object words. The multilingual translator engine may also include an embedded phrase translator engine configured to translate, via a translating device processor, the at least one embedded word phrase to a target natural language, based on at least one context associated with the communication object.

According to another aspect, a computer program product tangibly embodied on a computer-readable medium may include executable code that, when executed, is configured to cause at least one data processing apparatus to receive a communication object including a plurality of object words arranged in sequence, parse the communication object to identify each of the object words as tokens, identify at least one of the tokens as an embedded transliterated word that includes a transliterated character string associated with a first natural language, and identify at least another one of the tokens as a non-transliterated word. Further, the data processing apparatus may convert the embedded transliterated word to a corresponding non-transliterated character string representation based on a script representation associated with the first natural language.

According to another aspect, a communication object may be received that includes a plurality of object words. The communication object may be parsed to identify each of the object words as tokens. A first natural language and at least one embedded natural language different from the first natural language that are associated with the plurality of object words may be determined, based on a language analysis of the tokens. Tokens associated with the first natural language and tokens included in embedded word phrases associated with the at least one embedded natural language may be translated, via a translating device processor, to a target natural language, based on at least one context associated with the communication object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIGS. 2a-2c are a flowchart illustrating example operations of the system of FIGS. 1a-1c.

FIGS. 3a-3b are a flowchart illustrating example operations of the system of FIG. 1.

FIGS. 4a-4b are a flowchart illustrating example operations of the system of FIG. 1.

DETAILED DESCRIPTION

Figure 1A:
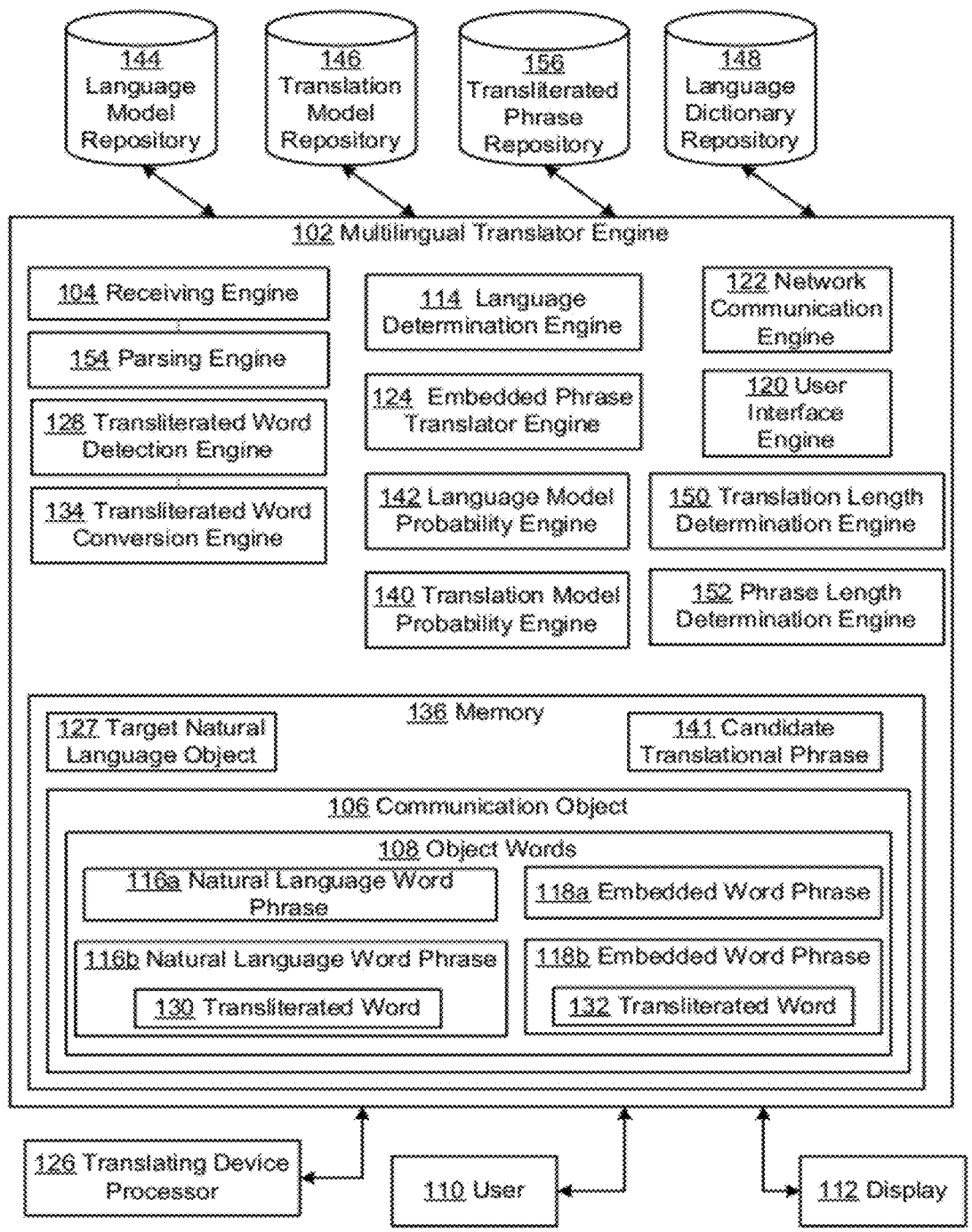
FIGS. 1a-1c are block diagrams of example systems for translation of multilingual embedded phrases.

In a multilingual environment, many authors or speakers may speak or type in more than one natural language. For example, an author may start typing a document in a language other than his/her native language, and may have difficulty expressing some concepts/words in the language of authorship. Given this situation, the author may elect to refer to a dictionary, which may suggest multiple translations. However, the author may not know which translation would be most appropriate for the authored text.

Machine translation output continues to lag in quality behind human authored text, often when the author is not proficient in a language. However, a person who is not proficient in a language may lack an appropriate vocabulary to express certain concepts. Thus, for example, if a native speaker of Arabic is not proficient in English, he/she may be able to type messages or documents mostly in English, but may only be able to express some concepts in Arabic, and not in English. In the example, the user may write mostly in English, while expressing the concepts in Arabic that he/she is unable to translate. Using example techniques discussed herein, the multilingual authored message or document may be translated to the target language associated with intended recipients.

For example, an Arabic speaker may wish to write "I had a meeting with the prime minister." However, the speaker may not know the English words for "prime minister." Using example techniques discussed herein, the Arabic speaker may write the Arabic word for "prime minister" embedded in the other English words that he/she knows, for example, as "I had a meeting with ﻳﻴﺴﻲ ﺍﻟﻮﺯﺭﺍﺀ." The whole sentence may be input to such example techniques, and may be translated to a target language such as English.

Given that an author authored a document in a foreign language while embedding word sequences in a native language within the text, example techniques described herein may automatically translate the foreign language sequences, at least based on the context of the document. Additionally, if the foreign language and native language have different alphabets with different scripts, the author may alternatively transliterate the foreign language script in the native script or vice versa, and example techniques described herein may automatically detect such transliteration and recover the original script, based on converting the authored text to a script associated with the natural language.

Thus, for example, a user may author a document in multiple languages and automatically generate a monolingual document in a desired language based on context sensitive machine translation, using example techniques described herein. Further, the user may use original language scripts or transliterated versions of the scripts to author the documents.

According to an example embodiment, transforming a document authored in multiple languages into a monolingual document may be achieved using machine translation (MT) directly. For example, given a document written in languages E and F, wherein F is the desired target language, an example MT engine may be requested to translate the document to F. According to an example embodiment, words written in language F may be determined to be out of vocabulary by the MT engine and may be unaffected by the translation process. According to an example embodiment, the MT engine may determine multiple translations for words in language E (e.g., using a translation model) and then use a language model associated with language F to select a most appropriate translation, using the untranslated words in language F as context. One skilled in the art of data processing will appreciate that compilers, assemblers, and interpreters may employ parsing techniques on input text strings, in order to recognize tokens as grammatical units included in the text string. The tokens may then be analyzed further, for example, in context, to determine at least one interpretation associated with a meaning associated with the input string.

For detecting transliterated scripts, a language detection engine may be used to automatically detect whether a parsed token is a word written in an original language script or in a transliterated form. According to an example embodiment, language detection may combine many sources of evidence such as character-level language model probability, frequency of a word in a language, frequency of a phonetically similar word in a language, and word level language model probability. If the language detection engine detects that a word is transliterated, it may automatically convert the word into the original language script.

In this context, "transliteration" includes a general technique of converting characters from one script to another, where the result is roughly phonetic for languages in the target script. For example, "Phobos" and "Deimos" are transliterations of Greek mythological "Φόβος" and "Δεῖμος" into Latin letters, used to name the moons of Mars.

Figure 1B:
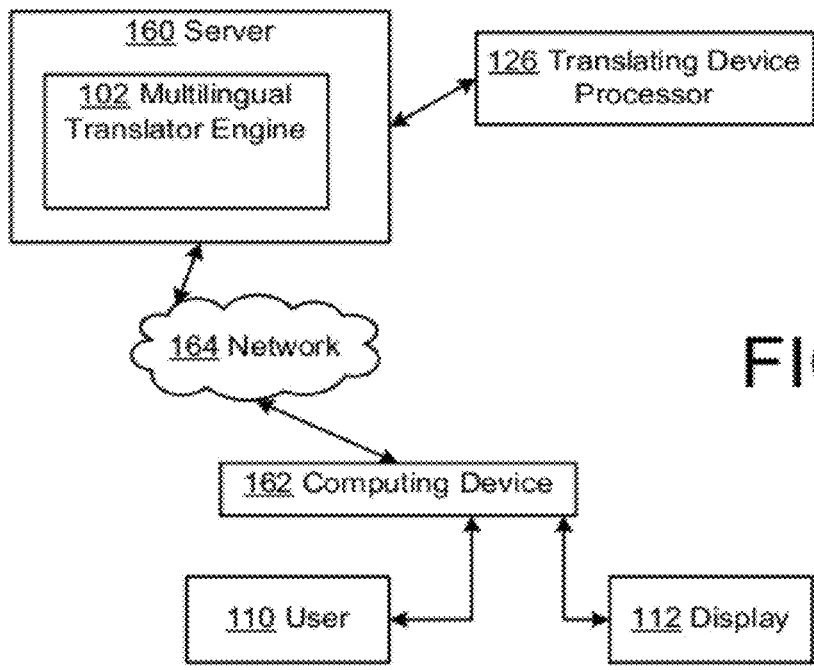
Figure 1C:
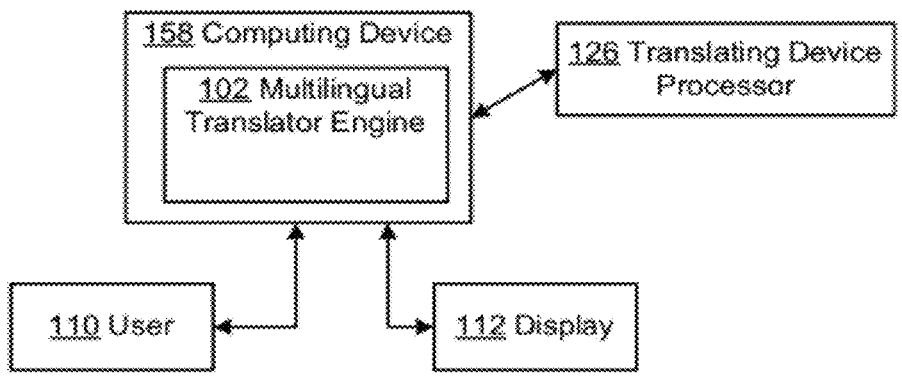

As further discussed herein, FIG. 1 is a block diagram of a system 100 for translation of multilingual embedded phrases. As shown in FIGS. 1a-1c, the system 100 may include a multilingual translator engine 102 that includes a receiving engine 104 that may be configured to receive a communication object 106 including a plurality of object words 108 arranged in sequence. For example, the communication object 106 may include a document that has been typed in by a user 110 while viewing a display 112. The communication object 106 may also include text that is typed into a text area on an interactive screen, or it may include text resulting from voice recognition of object words 108 spoken by a speaker.

For example, the display 112 may provide a visual, audio, and/or tactile medium for the user 110 to monitor his/her input to and responses from the multilingual translator engine 102. For example, a browser may provide a visual display based on a network transmission from a server or a device translation application associated with the browser. For example, a translation feature may be included in an application such as a word processor, for display on the display device 112. One skilled in the art of data processing may appreciate that many techniques may be used for providing a display of the translation features to the user 110.

For example, the user 110 may provide input via a touchpad, a touchscreen, a keyboard or keypad, a mouse device, a trackball device, or an audio input device or other input sensing device. For example, the user 110 may speak information for voice recognition processing to character format. In this context, a "word" may include a single language item, and a "phrase" may include a sequence of one or more words.

A language determination engine 114 may be configured to determine a first natural language and at least one embedded natural language different from the first natural language associated with the communication object 106, based on at least one first language word phrase 116 associated with the first natural language and at least one embedded word phrase 118 associated with the at least one embedded natural language that are included in the plurality of object words 108. A user interface engine 120 may be configured to manage communications between the user 110 and the multilingual translator engine 102. A network communication engine 122 may be configured to manage network communication between the multilingual translator engine 102 and other entities that may communicate with the multilingual translator engine 102 via one or more networks.

An embedded phrase translator engine 124 may be configured to translate, via a translating device processor 126, the at least one embedded word phrase 118 to a target natural language, based on at least one context associated with the communication object 106. For example, the embedded phrase translator engine 124 may translate Arabic word phrases embedded in an English word document to English, while leaving surrounding English text as originally written. As another example, the embedded phrase translator engine 124 may translate the Arabic words and the English words to a target language object 127 in French.

According to an example embodiment, the multilingual translator engine 102 may include a transliterated word detection engine 128 configured to determine at least one transliterated word 130, 132 included in the communication object 106, each transliterated word 130, 132 including a transliterated character string. According to an example embodiment, the multilingual translator engine 102 may include a transliterated word conversion engine 134 configured to convert the at least one transliterated word to one of the at least one embedded natural language, the first natural language, and the target natural language, as discussed further below.

In this context, a "processor" may include a single processor or multiple processors configured to process instructions associated with a processing system. A processor may thus include multiple processors processing instructions in parallel and/or in a distributed manner.

According to an example embodiment, the target natural language includes the first natural language. For example, the communication object 106 may include English text, and the intended target language may be English.

According to an example embodiment, a memory 136 may be configured to store the communication object 106 including the object words 108. In this context, a "memory" may include a single memory device or multiple memory devices configured to store data and/or instructions.

According to an example embodiment, the multilingual translator engine 102 may include a translation model probability engine 140 configured to determine a translation model probability value associated with a candidate translational phrase 141, based on a frequency of occurrence value associated with the candidate translational phrase. For example, the translation model probability value may indicate a high level of occurrence of particular candidate translations, based on historical translation data.

According to an example embodiment, the multilingual translator engine 102 may include a language model probability engine 142 configured to determine a language model probability value associated with the candidate translational phrase 141, based on a predictive value associated with a sequential word context associated with a language model. For example, the language model probability value may indicate a high level of occurrence of particular candidate translations, given the current context of the object words 108 in sequence. An example language model may be generated based on determining the probability that a sequence would occur in a natural language conversation or natural language document based on observing a large amount of text in the language. Thus, the language model may statistically predict a "next" word or phrase in a sequence of words associated with a natural language that forms the basis of the language model. The language model probability value may be based on information included in a language model repository 144, which may be configured to store information obtained based on a large corpus of documents by analyzing contexts of words in documents that have been translated from a source language to a target language. Based on such analyses, the language model probability value may predict a particular word or phrase that would be expected next in a sequence of object words in a source language. According to an example embodiment, a ranked listing of suggested translations may be obtained.

The translation model probability value may be based on information included in a translation model repository 146, which may be configured to store information obtained based on a large parallel corpus of documents by analyzing translational occurrences of words in documents that have been translated from a source language to a target language. Based on such analyses, the translation model probability value may provide several candidate translations for a word or phrase, and may predict a particular word or phrase that would be highly expected as a translation from a source phrase to a target phrase. Further, direct translation information may be obtained from a language dictionary repository 148. According to an example embodiment, a ranked listing of suggested translations may be obtained.

According to an example embodiment, the embedded phrase translator engine 124 may be configured to translate, via the translating device processor 126, the at least one embedded word phrase 118 to the target natural language, based on combining the translation model probability value and the language model probability value that are associated with candidate translational phrases 141 associated with the communication object 106.

According to an example embodiment, the embedded phrase translator engine 124 may be configured to translate, via the translating device processor 126, the at least one embedded word phrase 118 to the target natural language, based on an arithmetic product of the translation model probability value and the language model probability value. For example, the translation model probability value and the language model probability value associated with candidate translations may be multiplied together to provide a highest ranking candidate translation.

According to an example embodiment, the embedded phrase translator engine 124 may be configured to translate, via the translating device processor 126, the at least one embedded word phrase 118 to the target natural language, based on an arithmetic sum of logs of the translation model probability values and the language model probability values. For example, the log of translation model probability value and the log of language model probability value associated with candidate translations may be summed together to provide a highest ranking candidate translation. One skilled in the art of data processing will appreciate that generating sums of logarithms may be utilized to obtain more accurate results than multiplication of values representing probabilities (e.g., utilizing the equation $\log a*b = \log a + \log b$).

According to an example embodiment, the multilingual translator engine 102 may include a translation length determination engine 150 configured to determine a length of a candidate translation (e.g., candidate translational phrase 141) of a group of the object words.

According to an example embodiment, the multilingual translator engine 102 may include a phrase length determination engine 152 configured to determine a difference between a length of a phrase of object words 108 associated with the at least one embedded natural language and a length of a phrase associated with the target natural language that corresponds to a candidate translation of the phrase of object words 108.

According to an example embodiment, the embedded phrase translator engine 124 may be configured to translate the at least one embedded word phrase 118 to the target natural language, based on at least one of the length of the candidate translation (e.g., candidate translational phrase 141) of the group of the object words 108, and the difference between the length of the phrase of object words 108 associated with the at least one embedded natural language and the length of the phrase associated with the target natural language that corresponds to the candidate translation of the phrase of object words 108 (e.g., candidate translational phrase 141).

According to an example embodiment, the multilingual translator engine 102 may include a parsing engine 154 configured to recognize each of the plurality of object words 108 as a token. According to an example embodiment, the language determination engine 114 may be configured to identify a determined natural language associated with each word recognized by the parsing engine 154. According to an example embodiment, the determined natural language may include one of the at least one embedded natural language and the first natural language.

According to an example embodiment, the language determination engine 114 may be configured to determine the first natural language and the at least one embedded natural language, based on a received user input specifying the first natural language and the at least one embedded natural language.

According to an example embodiment, the language determination engine 114 may be configured to determine the first natural language and the at least one embedded natural language, based on a language analysis of at least one of the object words 108 recognized by the parsing engine 154.

According to an example embodiment, the transliterated word conversion engine 134 may be configured to convert the transliterated words 130, 132 based on information obtained from a transliterated phrase repository 156. For example, a communication object 106 may include a phrase such as "I met mo7afez Cairo". According to an example embodiment, the object word "mo7afez" may be identified as an Arabic transliterated word 132 by the transliterated word detection engine 128, while "I met" and "Cairo" may be identified as non-transliterated words 116a by the language determination engine 114. According to an example embodiment, the transliterated word conversion engine 134 may convert "mo7afez" to a non-transliterated script representation associated with one of the embedded natural languages. For example, in Arabic, the transliterated word "mo7afez" may be converted to a non-transliterated Arabic script representation "محافظ".

According to an example embodiment, the transliterated word detection engine 128 may identify the transliterated word "mo7afez" based on information obtained from the transliterated phrase repository 156. According to an example embodiment, the transliterated word conversion engine 134 may convert "mo7afez" to a non-transliterated script representation based on information obtained from the transliterated phrase repository 156 and/or the language dictionary repository 148.

According to an example embodiment, the multilingual translator engine 102 may be located on a computing device 158 associated with the user 110 or on a server 160 that is in communication with a computing device 162 via a network 164, as shown in FIGS. 1b-1c. For example, the computing device 158, 162 may include a desktop or personal computer, or a mobile device such as a smart phone.

A language model (e.g., a statistical language model) may include a data model that provides an estimate of a probability of occurrence of a sequence of items. Example statistical language models may employ counting techniques to provide such probabilities. For example, a corpus of sentences used to generate a statistical language model may include the following three sentences:

(1) "I love our neighbors."
(2) "We love our father."
(3) "They love each other."

An example statistical language model may be generated using these sentences by counting occurrences of each word, yielding the following table:

TABLE 1

| Word | Frequency |
|---|---|
| I | 1 |
| love | 3 |

TABLE 1-continued

| Word | Frequency |
|---|---|
| our | 2 |
| neighbors | 1 |
| we | 1 |
| father | 1 |
| They | 1 |
| other | 1 |

Using Table 1 above, a user may obtain answers to queries such as requests for the most frequent and second most frequent words (e.g., "love" and "our" in this case). Table 1 shown above is an example of a unigram model, as it is generated by counting words one by one.

Another, more sophisticated, statistical language model may be generated by counting words in pairs (i.e., two by two), to generate a bigram model. Following similar techniques, other models may also be generated (e.g., trigram models, quadgram models, etc.).

According to an example embodiment, the language determination engine 114 may distinguish a pair of different natural languages associated with text included in a communication object 106 based on analysis of input text Unicode codepages.

According to an example embodiment, the language determination engine 114 may include an example statistical classifier. For example, if the communication object 106 is associated with English and Arabic as a pair of natural languages, then the statistical classifier may determine whether a particular parsed word is an English word or an Arabic word written in Roman letters. Such an example statistical classifier may be trained based on a significant corpus of words from both natural languages. The example statistical classifier may then estimate the likelihood of an input word being associated with either natural language, based on observing (a) a probability that the input word is English; (b) a probability that the input word has a corresponding Arabic transliteration; (c) an English character-level language model probability of the input word (e.g., likelihood that the set of characters of the input word would appear in that order in English); and (d) an Arabic character-level language model probability of the input word.

A general discussion of statistical machine translation systems may be found, for example, in Koehn et al., "Moses: Open Source Toolkit for Statistical Machine Translation," in Annual Meeting of the Association for Computational Linguistics (ACL), demonstration session, Prague, Czech Republic, June 2007. Further, an example system developed in accordance with techniques associated with the Koehn et al. paper may include a statistical machine translation system that allows a user to automatically train translation models for selected language pairs, based on input collections of translated texts (e.g., each translation model may be trained on a parallel corpus). An example search algorithm may determine a highest probability translation among an exponential number of choices.

Figure 2A:
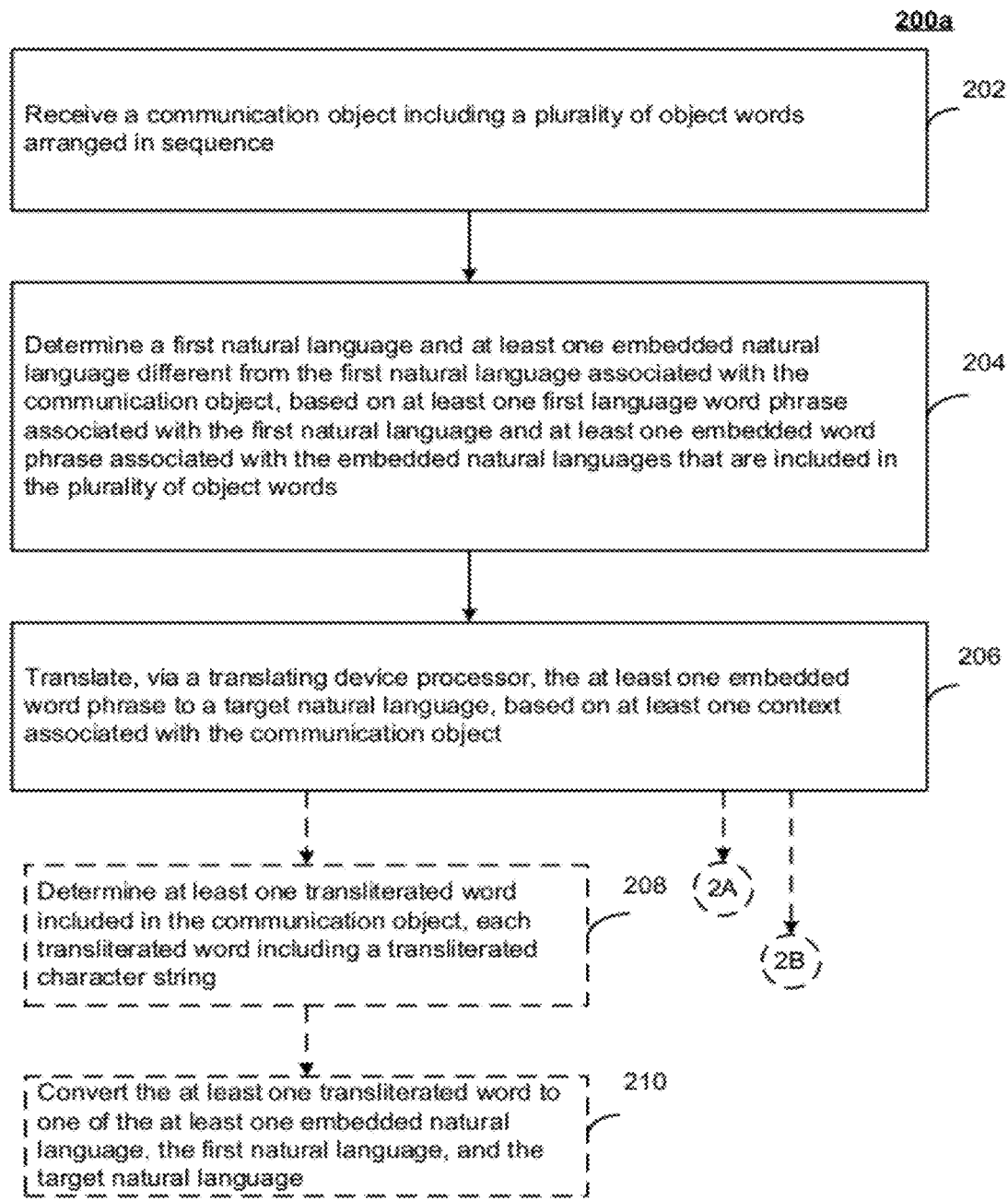

FIGS. 2a-2c are a flowchart 200 illustrating example operations of the system of FIGS. 1a-1c. In the example of FIG. 2a, a communication object including a plurality of object words arranged in sequence may be received (202). For example, the user 110 may provide input characters of a group of character strings (e.g., a document) via the computing device 158, 162. A user interface (e.g., the user interface engine 120) may manage the communication between the user 110 and the computing device 158, 162. For example, the receiving engine 104 discussed above may receive the communication object 106.

A first natural language and at least one embedded natural language different from the first natural language associated with the communication object may be determined, based on at least one first language word phrase associated with the first natural language and at least one embedded word phrase associated with the at least one embedded natural language that are included in the plurality of object words (204). For example, the language determination engine 114 discussed above may determine the first natural language and the at least one embedded natural language.

The at least one embedded word phrase may be translated, via a translating device processor, to a target natural language, based on at least one context associated with the communication object (206). For example, the embedded phrase translator engine 124 may translate, via the translating device processor 126, the at least one embedded word phrase 118 to the target natural language, based on at least one context associated with the communication object 106, as discussed above.

According to an example embodiment, at least one transliterated word included in the communication object may be determined, each transliterated word including a transliterated character string (208). For example, the transliterated word detection engine 128 may determine at least one transliterated word 130, 132 included in the communication object 106. According to an example embodiment, the at least one transliterated word may be converted to one of the at least one embedded natural language, the first natural language, and the target natural language (210). For example, the transliterated word conversion engine 134 discussed above may convert the transliterated words 130, 132 to one of the at least one embedded natural language, the first natural language, and the target natural language.

According to an example embodiment, each of the plurality of object words may be recognized as a token (212). A determined natural language associated with each word may be recognized (214). For example, the tokens may be recognized by the parsing engine 154, and the determined natural language may be recognized by the language determination engine 114, as discussed above.

According to an example embodiment, a translation model probability value associated with a candidate translational phrase may be determined, based on a frequency of occurrence value associated with the candidate translational phrase (216). For example, the translation model probability engine 140 may determine the translation model probability value associated with the candidate translational phrase 141, as discussed above. According to an example embodiment, a language model probability value associated with the candidate translational phrase may be determined, based on a predictive value associated with a sequential word context associated with a language model (218). For example, the language model probability engine 142 may determine the language model probability value associated with the candidate translational phrase 141, as discussed above.

According to an example embodiment, the at least one embedded word phrase may be translated, via the translating device processor, to the target natural language, based on combining the translation model probability value and the language model probability value that are associated with candidate translational phrases associated with the communication object (220). For example, the at least one embedded word phrase 118 may be translated to the target natural language, based on combining the translation model probability value and the language model probability value that are associated with candidate translational phrases 141 associated with the communication object 106. For example, the embedded phrase translator engine 124 may perform the translation, via the translating device processor 126.

According to an example embodiment, a length of a candidate translation of a group of the object words may be determined (222). A difference between a length of a phrase of object words associated with the at least one embedded natural language and a length of a phrase associated with the target natural language that corresponds to a candidate translation of the phrase of object words may be determined (224). The at least one embedded word phrase may be translated to the target natural language, based on at least one of the length of the candidate translation of the group of the object words, and the difference between the length of the phrase of object words associated with the at least one embedded natural language and the length of the phrase associated with the target natural language that corresponds to the candidate translation of the phrase of object words (226). According to an example embodiment, the at least one embedded word phrase may be translated to the target natural language based on at least one of the length of the candidate translation (e.g., candidate translational phrase 141) of the group of the object words, and the difference between the length of the phrase of object words associated with the at least one embedded natural language and the length of the phrase associated with the target natural language that corresponds to the candidate translation (e.g., candidate translational phrase 141) of the phrase of object words 108. For example, the translation length determination engine 150 may determine a length of a candidate translation of a group of the object words 108.

For example, the phrase length determination engine 152 discussed above may determine a difference between the length of the phrase of object words associated with one of the at least one embedded natural language and the length of the phrase associated with the target natural language that corresponds to the candidate translation (e.g., candidate translational phrase 141) of the phrase of object words. For example, the embedded phrase translator engine 124 may translate the embedded word phrases to the target natural language, based on at least one of the length of the candidate translation of the group of the object words and the difference between the length of the phrase of object words associated with the at least one embedded natural language and the length of the phrase associated with the target natural language that corresponds to the candidate translation of the phrase of object words.

According to an example embodiment, the at least one embedded word phrase may be translated, via the translating device processor, to the target natural language, based on one of an arithmetic product of the translation model probability value and the language model probability value, and an arithmetic sum of the log of the translation model probability value and log of the language model probability value (228). For example, the embedded phrase translator engine 124 may be configured to translate, via the translating device processor 126, the at least one embedded word phrase 118 to the target natural language, based on an arithmetic product of the translation model probability value and the language model probability value. For example, the embedded phrase translator engine 124 may be configured to translate, via the translating device processor 126, the at least one embedded word phrase 118 to the target natural language, based on an arithmetic sum of logs of the translation model probability values and the language model probability values, as discussed above.

Figure 3A:
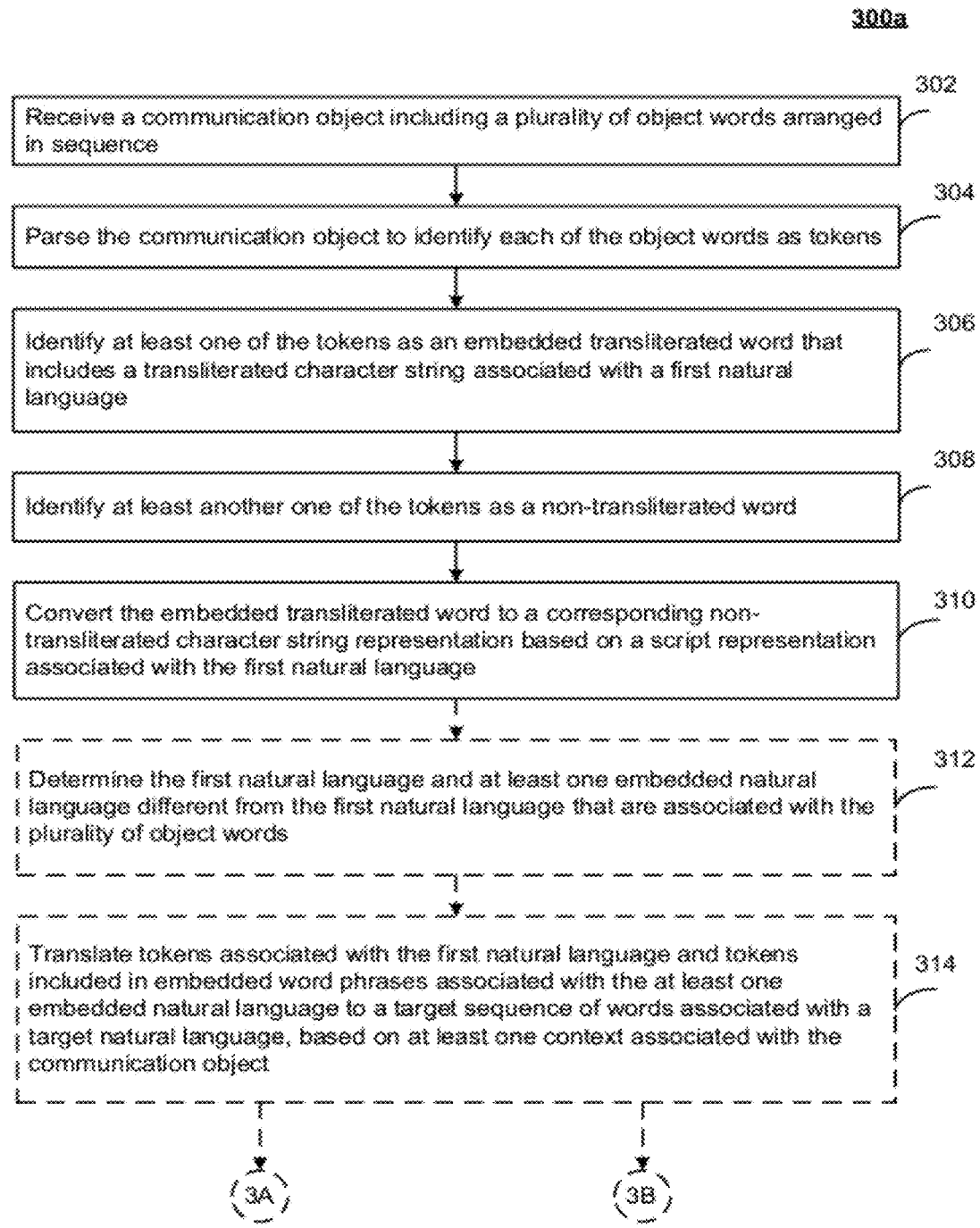

FIGS. 3a-3b are a flowchart illustrating example operations of the system of FIG. 1. In the example of FIG. 3a, a communication object may be received that includes a plurality of object words arranged in sequence (302). For example, the communication object may include a text phrase, a document, or a group of object words scanned by a scanner or received by speech sensors. For example, the communication object 106 may be received by the receiving engine 104 discussed above. The communication object 106 may be parsed to identify each of the object words as tokens (304). For example, the parsing engine 154 may parse the object words 108 as discussed above.

At least one of the tokens may be identified as an embedded transliterated word that includes a transliterated character string associated with a first natural language (306). For example, the transliterated word detection engine 128 may identify the embedded transliterated word 132, as discussed above. At least another one of the tokens may be identified as a non-transliterated word (308). For example, the language determination engine 114 may identify non-transliterated words 116a, 118a that are included with transliterated words 130, 132 in the communication object 106.

The embedded transliterated word may be converted to a corresponding non-transliterated character string representation based on a script representation associated with the first natural language (310). For example, the transliterated word conversion engine 134 may convert the identified embedded transliterated word (or words) 130, 132 as discussed above. For example, a communication object 106 may include a phrase such as "I met mo7afez Cairo". According to an example embodiment, the object word "mo7afez" may be identified as an Arabic transliterated word 132 by the transliterated word detection engine 128, while the phrases "I met" and "Cairo" may be identified as including non-transliterated words 116a by the language determination engine 114. According to an example embodiment, the transliterated word conversion engine 134 may convert "mo7afez" to a non-transliterated Arabic script representation "ظفاحم", as discussed above.

According to an example embodiment, the first natural language and at least one embedded natural language different from the first natural language that are associated with the plurality of object words may be determined (312). For example, the language determination engine 114 may determine the different natural languages based on at least one first language word phrase 116 associated with the first natural language and one or more embedded word phrases 118 associated with the at least one embedded natural language that are included in the plurality of object words 108, as discussed above. For example, the natural languages may be determined based at least in part on information obtained from the language dictionary repository 148.

According to an example embodiment, tokens associated with the first natural language and tokens included in embedded word phrases associated with the embedded natural languages may be translated to a target sequence of words associated with a target natural language, based on at least one context associated with the communication object (314). For example, the embedded phrase translator engine 124 may translate the embedded word phrases to target sequences of words, as discussed above. According to an example embodiment, if the first natural language is different from the target natural language, the embedded phrase translator engine 124 may also be used to translate the tokens associated with the first natural language to the target natural language. In this example, a context associated with sequences of tokens associated with the first natural language may be used for performing the translations. According to an example embodiment, a natural language may be selected for use as a context base for performing the translations.

According to an example embodiment, the tokens associated with the first natural language and the tokens included in embedded word phrases associated with the at least one embedded natural language may be translated to the target sequence of words associated with the target natural language, based on at least one translation function of attributes associated with candidate translational phrases associated with the communication object may be translated (316). According to an example embodiment, the embedded phrase translator engine 124 may be configured to translate, via the translating device processor 126, the tokens associated with the first natural language and the tokens included in embedded word phrases associated with the at least one embedded natural language to the target sequence of words associated with the target natural language, based on at least one translation function of attributes associated with candidate translational phrases associated with the communication object.

For example, the translation function may include combining probabilities or frequencies associated with models that are associated with translation, or determining attributes of various items involved in translations (e.g., sequence lengths), and performing operations on the attributes. For example, the translation function may include combining probabilities such as the translation model probability and the language model probability, or a length of a candidate translation of the group of object words, or a difference between a length of a phrase of object words associated with one of the at least one embedded natural language and a length of a phrase associated with the target natural language that corresponds to a candidate translation of the phrase of object words. One skilled in the art of data processing will appreciate that there are many such features associated with translations, which may be effectively used for determining a ranked listing of candidate translations.

According to an example embodiment, the tokens associated with the first natural language and the tokens included in embedded word phrases associated with the at least one embedded natural language may be translated to the target sequence of words associated with the target natural language, based on at least one of combining a translation model probability value and a language model probability value that are associated with candidate translational phrases associated with the communication object, a length of a candidate translation of the group of the object words, and a difference between a length of a phrase of object words associated with one of the at least one embedded natural language and a length of a phrase associated with the target natural language that corresponds to a candidate translation of the phrase of object words (318). For example, the tokens associated with the first natural language 116 and the tokens included in embedded word phrases 118 associated with the at least one embedded natural language may be translated to the target sequence of words associated with the target natural language (e.g., the target natural language object 127), based on at least one of combining a translation model probability value and a language model probability value that are associated with candidate translational phrases associated with the communication object 106, a length of a candidate translation of the group of the object words 108 (e.g., candidate translational phrase 141), and a difference between a length of a phrase of object words 108 associated with one of the at least one embedded natural language and a length of a phrase associated with the target natural language that corresponds to a candidate translation of the phrase of object words 108. For example, the translation model probability engine 140 may determine the translation model probability value associated with the candidate translational phrase 141 and the language model probability engine 142 may determine the language model probability value associated with the candidate translational phrase 141, based on a predictive value associated with a sequential word context associated with a language model, as discussed above.

For example, the embedded phrase translator engine 124 may perform the translations based on combining the translation model probability value and the language model probability value that are associated with candidate translational phrases 141 associated with the communication object 106, as discussed above. According to an example embodiment, the combining may be based on multiplying the translation model probability value with the language model probability value to obtain a ranking of the candidate translational phrases 141. According to an example embodiment, the combining may be based on summing of the log of the translation model probability values with the log of the language model probability values to obtain a ranking of the candidate translational phrases 141 (e.g., to provide greater accuracy than multiplication of probability values). According to an example embodiment, a ranked list of candidate translational phrases 141 resulting from the translation may be provided for selection by a user.

For example, the translation length determination engine 150 may determine the length of a candidate translation of the group of the object words. For example, the phrase length determination engine 152 may determine the lengths of phrases of object words and lengths of phrases associated with the target natural language that correspond to the candidate translations of the phrases of object words 108, as discussed above. According to an example embodiment, the embedded phrase translator engine 124 may translate the embedded word phrases 118 to the target natural language, based on at least one of the length of the candidate translation (e.g., candidate translational phrase 141) and the difference between the length of the phrase of object words associated with the at least one embedded natural language and the length of the phrase associated with the target natural language that corresponds to the candidate translation of the phrase of object words, as discussed above.

According to an example embodiment, the target natural language may include one of the at least one embedded natural language and the first natural language.

Figure 4A:
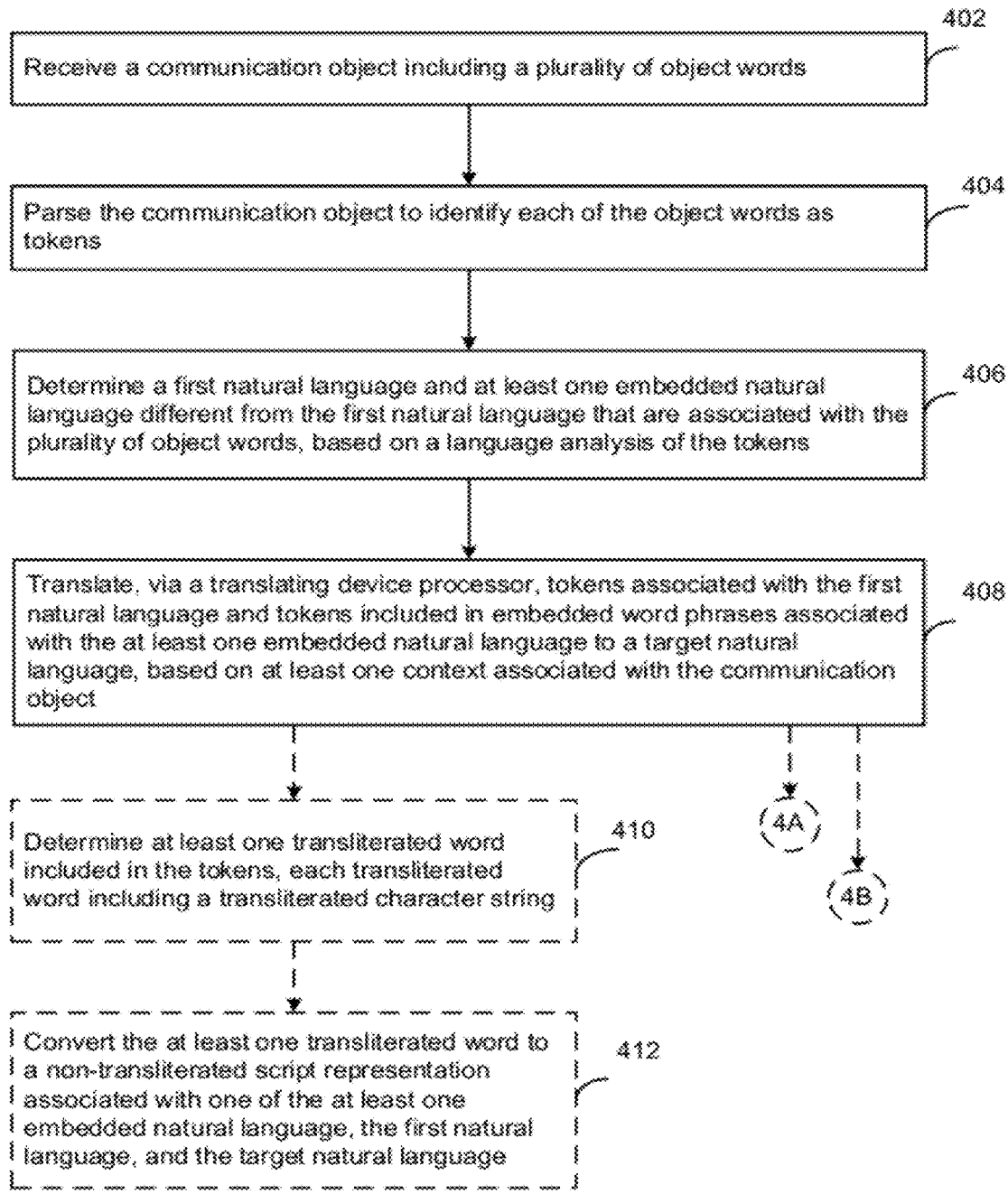

FIGS. 4a-4b are a flowchart illustrating example operations of the system of FIG. 1. In the example of FIG. 4, a communication object may be received that includes a plurality of object words (402). For example, the communication object 106 may include a text phrase, a document, or a group of object words 108 scanned or received by speech sensors. For example, the communication object 106 may be received by the receiving engine 104 discussed above. The communication object may be parsed to identify each of the object words as tokens (404). For example, the parsing engine 154 may parse the object words 108, as discussed above.

A first natural language and at least one embedded natural language different from the first natural language that are associated with the plurality of object words may be determined, based on a language analysis of the tokens (406). For example, the language determination engine 114 may determine the first natural language and the at least one different embedded natural language associated with the plurality of object words 108, as discussed above.

Tokens associated with the first natural language and tokens included in at least one embedded word phrase associated with the at least one embedded natural language may be translated, via a translating device processor, to a target natural language, based on at least one context associated with the communication object (408). For example, the embedded phrase translator engine 124 may perform the translations, as discussed above.

According to an example embodiment, at least one transliterated word included in the tokens may be determined, each transliterated word including a transliterated character string (410). For example, the transliterated word detection engine 128 may determine transliterated words 130, 132 included in the communication object 106, as discussed above. For example, the object word "mo7afez" may be identified as an Arabic transliterated word 132 by the transliterated word detection engine 128.

According to an example embodiment, the at least one transliterated word may be converted to a non-transliterated script representation associated with one of the at least one embedded natural language, the first natural language, and the target natural language (412). For example, the transliterated word conversion engine 134 may convert the Arabic transliterated word "mo7afez" to a non-transliterated Arabic script representation "ظفاحم", as discussed above.

According to an example embodiment, translating the tokens may include translating, via the translating device processor, the tokens associated with the first natural language and the tokens included in embedded word phrases associated with the at least one embedded natural language to a target natural language object, based on at least one translation function of attributes associated with candidate translational phrases associated with the communication object to generate a ranked list of candidate translation phrases (414).

According to an example embodiment, translating the tokens may include translating, via the translating device processor, the tokens associated with the first natural language and the tokens included in the at least one embedded word phrase associated with the at least one embedded natural language to the target natural language object, based on at least one of multiplying a translation model probability value by a language model probability value that are each associated with the communication object, determining a length of a translation, and determining a difference between a length of a phrase of object words associated with the at least one embedded natural language and a length of a phrase associated with the target natural language that corresponds to a candidate translation of the phrase of object words (416).

According to an example embodiment, the target natural language may be determined based on a received user input specifying the target natural language.

Figure 5:
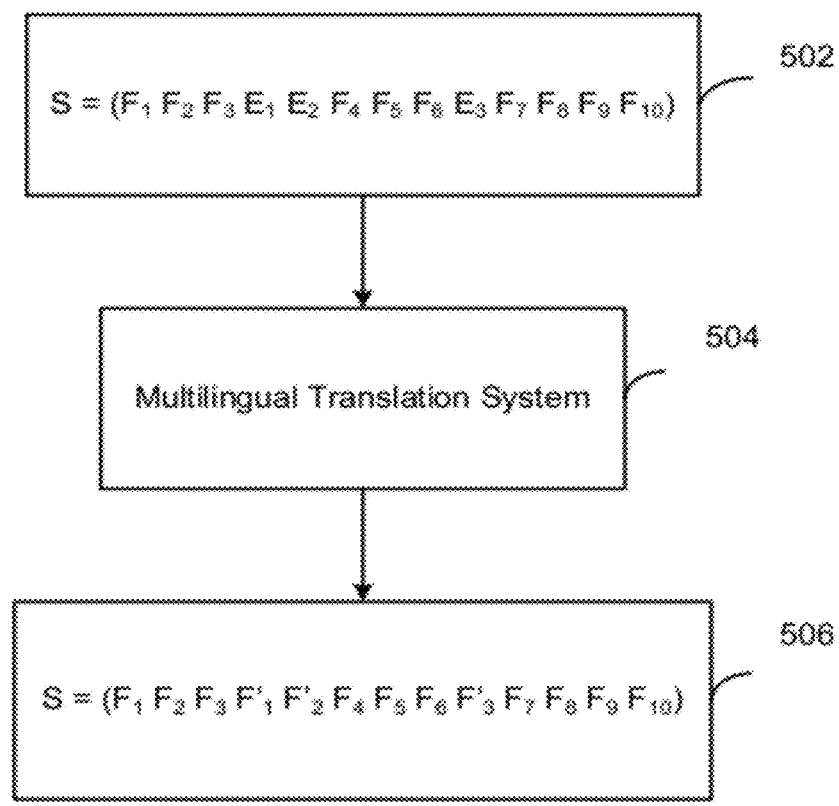
FIG. 5 is a block diagram of an example system for translation of multilingual embedded phrases.

FIG. 5 is a block diagram of an example system for translation of multilingual embedded phrases. As shown in FIG. 5, an input word sequence 502 may be input to an example multilingual translation system 504 to generate an output word sequence 506. The input word sequence 502 may be depicted more formally as $S=(F_1 F_2 F_3 E_1 E_2 F_4 F_5 F_6 E_3 F_7 F_8 F_9 F_{10})$. For the example of FIG. 5, the words indicated as $F_1$, $F_2$, $F_3$, $F_4$, $F_5$, $F_6$, $F_7$, $F_8$, $F_9$, and $F_{10}$ may represent words associated with a first natural language, and the words indicated as $E_1$, $E_2$, and $E_3$ may represent words associated with an embedded natural language. For example, the words indicated as $F_1 F_2 F_3$ may represent a sequential string of English words, while the words indicated as $E_1 E_2$ may represent a sequential string of Arabic words embedded in sequential strings of English words included in a communication object 106. Thus, the input word sequence 502 may include a sequence of three English words indicated as $F_1 F_2 F_3$, followed by two embedded Arabic words indicated as $E_1 E_2$, followed by three English words indicated as $F_4 F_5 F_6$, followed by one embedded Arabic word indicated as $E_3$, followed by four English words indicated as $F_7 F_8 F_9 F_{10}$, arranged in sequence.

The example multilingual translation system 504 (e.g., corresponding to an example embodiment of the multilingual translation engine 102 discussed above) may receive a communication object (e.g., communication object 106) including the input word sequence 502 as input, and generate a translation to a target natural language (e.g., the target natural language object 127) that includes the output word sequence 506. As shown in FIG. 5, the output word sequence 506 may be depicted more formally as $S=(F_1 F_2 F_3 F'_1 F'_2 F_4 F_5 F_6 F'_3 F_7 F_8 F_9 F_{10})$. Thus, for the example of FIG. 5, the example multilingual translation system 504 may identify the Arabic words that are embedded in the English words of the input word string 502 and may translate the embedded Arabic words to corresponding embedded English words, at least based on a context associated with the input word string 502.

According to an example embodiment, the translation may be performed based on multiplying a translation model probability value by a language model probability value that are associated with the communication object to generate a ranked list of candidate translation phrases, as discussed above. According to an example embodiment, the translation may be performed based on summing the log of translation model probability values by the log of language model probability values that are associated with the communication object to generate a ranked list of candidate translation phrases, as discussed above.

Figure 6:
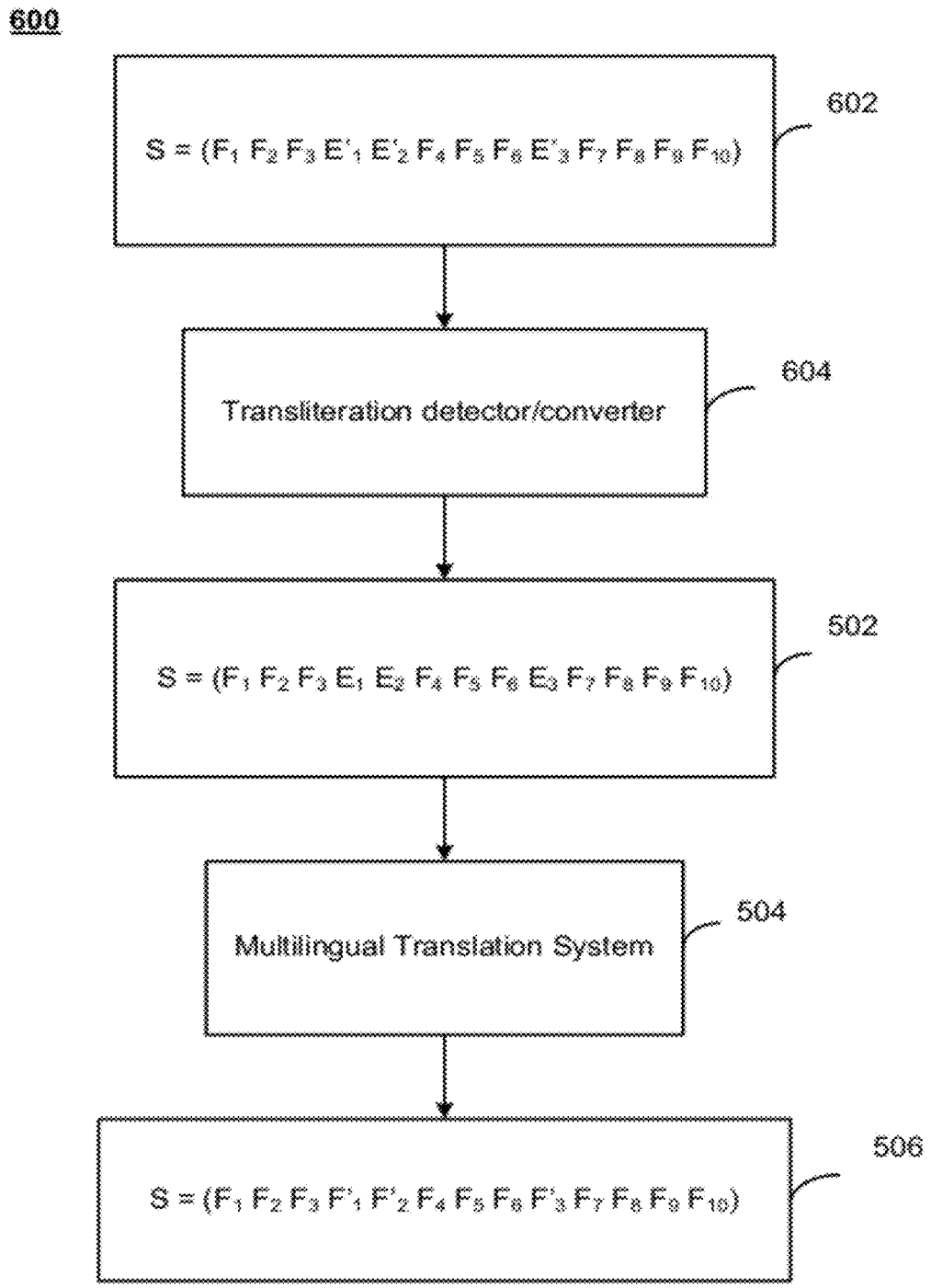
FIG. 6 is a block diagram of an example system for detecting and converting transliterated embedded phrases to corresponding non-transliterated embedded phrases.

FIG. 6 is a block diagram of an example system for detecting and converting transliterated embedded phrases to corresponding non-transliterated embedded phrases. As shown in FIG. 6, an input word sequence 602 may be input to an example transliteration detector/converter 604 to generate an output word sequence 502. The input word sequence 602 may be depicted more formally as $S=(F_1 F_2 F_3 E'_1 E'_2 F_4 F_5 F_6 E'_3 F_7 F_8 F_9 F_{10})$. For the example of FIG. 5, the words indicated as $F_1, F_2, F_3, F_4, F_5, F_6, F_7, F_8, F_9$, and $F_{10}$ may represent words associated with a first natural language, and the words indicated as $E'_1, E'_2$, and $E_3$ may represent transliterated words associated with an embedded natural language (e.g., using a script associated with the first natural language). For example, the words indicated as $F_1 F_2 F_3$ may represent a sequential string of English words, while the words indicated as $E'_1 E'_2$ may represent a sequential string of transliterated Arabic, Hindi, Hebrew, Chinese or Turkish words (based on English script) embedded in sequential strings of English words included in a communication object 106. Thus, the input word sequence 602 may include a sequence of three English words indicated as $F_1 F_2 F_3$, followed by two embedded transliterated Arabic, Hindi, Hebrew, Chinese or Turkish words indicated as $E'_1 E'_2$, followed by three English words indicated as $F_4 F_5 F_6$, followed by one embedded transliterated Arabic, Hindi, Hebrew, Chinese or Turkish word indicated as $E'_3$, followed by four English words indicated as $F_7 F_8 F_9 F_{10}$, arranged in sequence. The example transliteration detector/converter 604 (e.g., corresponding to example embodiments of the transliterated word detection engine 128 and the transliterated word conversion engine 134 discussed above) may receive a communication object (e.g., communication object 106) including the input word sequence 602 as input, and convert the transliterated words to a non-transliterated script representation, as discussed above.

Thus, the example transliteration detector/converter 604 may detect the embedded transliterated Arabic, Hindi, Hebrew, Chinese or Turkish words indicated as $E'_1 E'_2$, and $E'_3$, and convert the transliterated words to corresponding non-transliterated script representations, indicated as $E_1 E_2$ and $E_3$, respectively, in the word string 502 as shown in FIG. 6. As shown in FIG. 6, the string 502 may then be used as input to the multilingual translation system 504 for generating the output word sequence 506, as discussed above with regard to FIG. 5.

Figure 7:
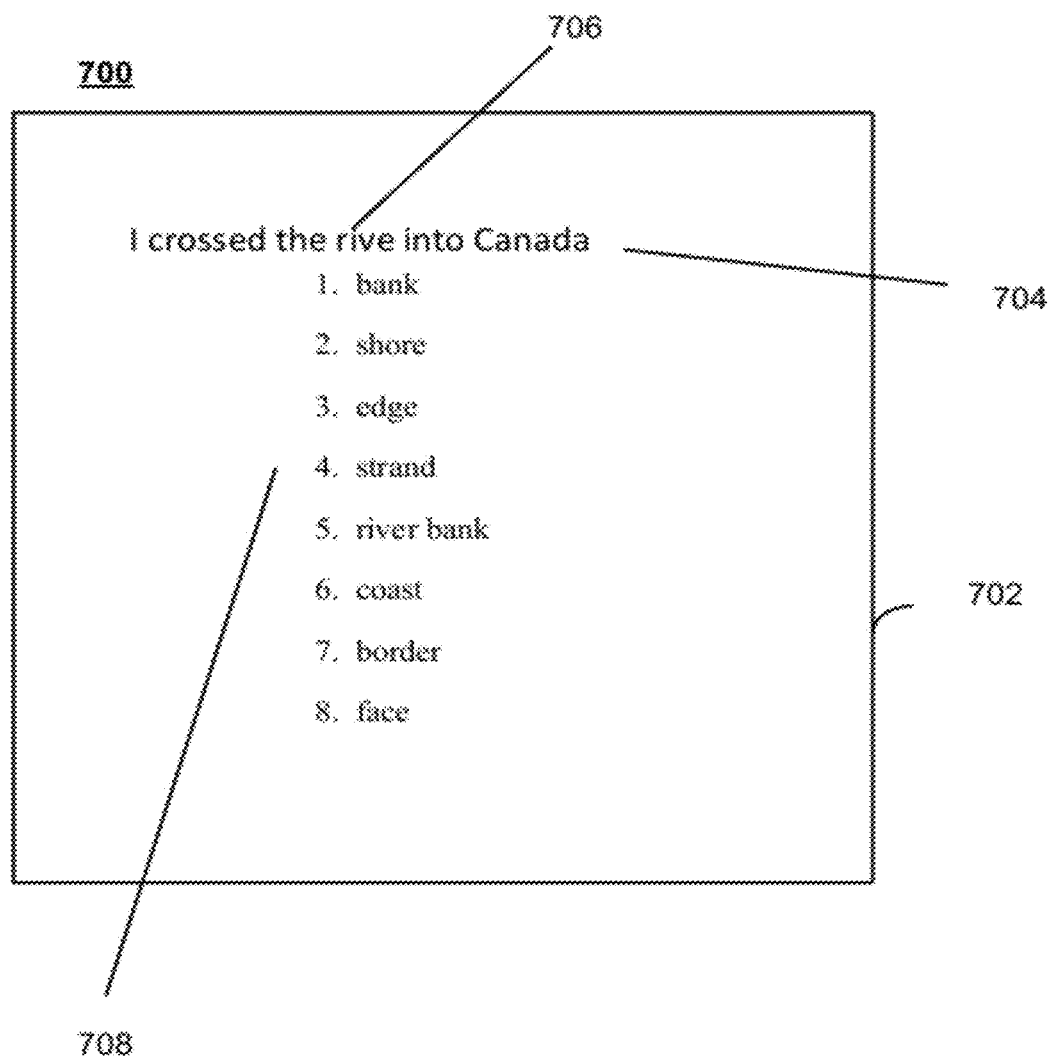
FIG. 7 depicts an example user view of a display of candidate translations of an embedded multilingual phrase.

FIG. 7 depicts an example user view 700 of a display of candidate translations of an embedded multilingual phrase. As shown in FIG. 7, a user (e.g., the user 110) may view a display 702 and provide a text string 704 (e.g., corresponding to the communication object 106) that includes a sequential word string indicated as "I crossed the rive into Canada". For this example, the example user 110 may natively understand French, and may wish to generate a communication object in English. However, as the user enters English words, he/she occasionally may not know or remember English equivalents of French words that he/she wishes to use in the communication object. Thus, the user 110 may enter English words with embedded French words that he/she understands. For example, the word "rive" 706 is an embedded French word included in a sequence of English words. As shown in FIG. 7, several candidate translations of "rive" may be provided as a ranked list 708.

As discussed herein, the ranked list may be generated based on a translation model probability, for example, based on a frequency of occurrence of particular words or phrases in a language. As shown in FIG. 7, the word "bank" may be included as a first-ranked selection for candidate translations of the word "rive". As discussed herein, language model probability values may be obtained by analyses of a very large corpus of past translations. Such an analysis may generate statistical analyses of contexts of words from past translations, for example, by analyzing probabilities of particular translations based on sequentially preceding words and words sequentially succeeding a word or phrase presented for translation. For the example of FIG. 7, a combination of a translation model probability and a language model probability may then provide "border" as a highest ranked candidate translation of "rive", based on a context of the occurrence of "rive" in the string 704.

Figure 8:
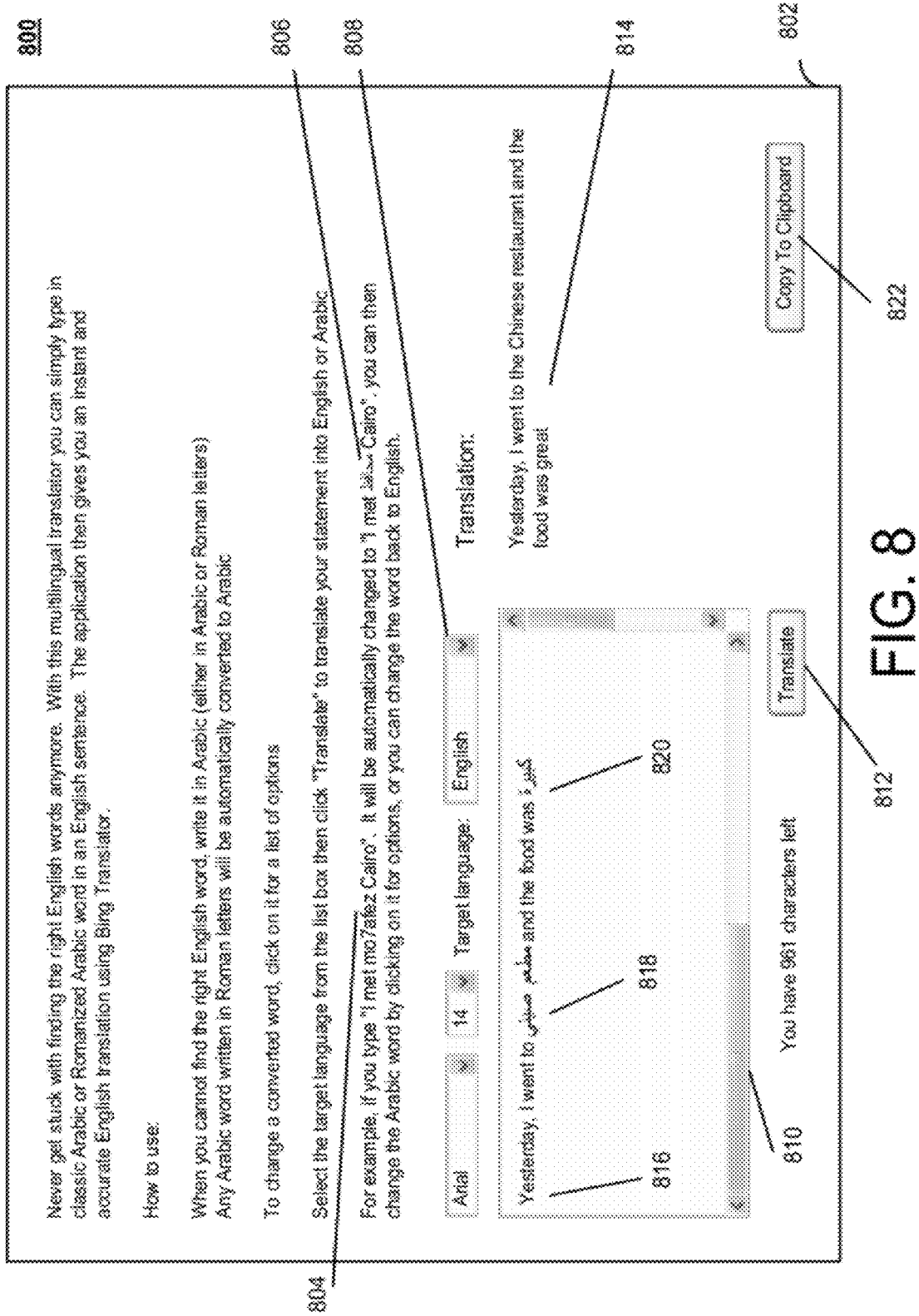
FIG. 8 depicts an example user view of a display of an interactive application for conversion of embedded transliterated phrases and translation of multilingual embedded phrases.

FIG. 8 depicts an example user view 800 of a display 802 of an interactive application for conversion of embedded transliterated phrases and translation of multilingual embedded phrases. According to an example embodiment, the user interface 120 of FIG. 1 may be used for interaction with the user 110 to provide the display 802. For example, a display may be provided via a browser on a user device. As shown in FIG. 8, the user may type in strings that include embedded transliterated words 132, and the example application of FIG. 8 will convert the embedded transliterated words 132 to corresponding non-transliterated character string representations based on a script representation associated with the natural language associated with the embedded transliterated words 132.

For example, the user instructions shown in FIG. 8 indicate that a user typing in the string "I met mo7afez Cairo", which includes an embedded transliterated Arabic word "mo7afez" 804, will receive an output converted string representation indicated as "I met ظفاحم Cairo", wherein the embedded transliterated Arabic word has been converted to a corresponding non-transliterated character string representation "ظفاحم" 806 based on a script representation associated with Arabic. As shown in FIG. 8, the user may select the converted Arabic word to receive options for changing the converted word, or the user may elect to change the converted word back to English.

As shown in FIG. 8, a target language selection box 808 may provide the user with a selection of target languages, and a text entry box 810 may provide an area in which to type communication objects 106 such as single words, multi-word phrases, sentences, or documents. The communication objects 106 may include embedded multilingual words and/or embedded transliterated words, as discussed above. The user 110 may enter text in the text box 810 and initiate a translation, for example, via activation of a "Translate" button 812. The user 110 may then view a generated translation in a translation viewing area 814.

As shown in FIG. 8, an example text string 816 may be entered in the text box 810. For example, the string "Yesterday I went to يني صم مطعم and the food was كبير ة" may be entered. The example string 806 thus includes English phrases indicated as "Yesterday I went to" and "and the food was", and embedded Arabic phrases indicated as "مطعم يني صم" 818 and "كبير ة" 820. An example translation of the string 816 is indicated in the translation area 814 as "Yesterday I went to the Chinese restaurant and the food was great". Thus, the example embodiment of the multilingual translator engine 102 underlying the example application depicted in FIG. 8 may receive input from the user 110 that may include multilingual embedded strings, as well as embedded transliterated strings, and may provide converted strings and/or translated strings in one or more target languages.

As shown in FIG. 8, the user 110 may then copy the resulting conversion/translation to a clipboard for pasting into other applications, for example, via activation of a "Copy to Clipboard" button 822. For example, the user 110 may wish to obtain on-the fly conversions/translations of text strings for inclusion in email messages or other documents. For example, the user may not have access to a keyboard that supports a native script associated with a particular language. Thus, the user may enter text in a transliterated form, and/or text in another language, to obtain a fully translated text string that may be copied and pasted into other documents, based on text entry from an available text entry device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.) or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand alone program or as a module, component, subroutine, or other unit suitable for use in a computing environment. A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system that includes at least one hardware device processor, the system comprising:
   a multilingual translator engine that includes:
      a receiving engine configured to receive a communication object including a plurality of object words arranged in sequence;
      a language determination engine configured to determine a first natural language and at least one embedded natural language different from the first natural language associated with the communication object, based on at least one first language word phrase associated with the first natural language and at least one embedded word phrase associated with the embedded natural language that are included in the plurality of object words;
      a translation length determination engine configured to determine a length of a candidate translation of a group of the object words; and
      an embedded phrase translator engine configured to translate, via a translating device processor, the at least one embedded word phrase to a target natural language, based on at least one context associated with the communication object, and based on the length of the candidate translation of the group of the object words.

2. The system of claim 1, further comprising:
   a transliterated word detection engine configured to determine at least one transliterated word included in the communication object, each transliterated word including a transliterated character string; and
   a transliterated word conversion engine configured to convert the at least one transliterated word to one of the at least one embedded natural language, the first natural language, and the target natural language.

3. The system of claim 1, wherein:
   the target natural language includes the first natural language.

4. The system of claim 1, further comprising:
   a translation model probability engine configured to determine a translation model probability value associated with a candidate translational phrase, based on a frequency of occurrence value associated with the candidate translational phrase; and
   a language model probability engine configured to determine a language model probability value associated with the candidate translational phrase, based on a predictive value associated with a sequential word context associated with a language model,
   wherein the embedded phrase translator engine is configured to translate, via the translating device processor, the at least one embedded word phrase to the target natural language, based on combining the translation model probability value and the language model probability value that are associated with candidate translational phrases associated with the communication object.

5. The system of claim 4, wherein:
   the embedded phrase translator engine is configured to translate, via the translating device processor, the at least one embedded word phrase to the target natural language, based on one of:
   an arithmetic product of the translation model probability value and the language model probability value, or
   an arithmetic sum of the log of the translation model probability value and log of the language model probability value.

6. The system of claim 4, further comprising:
   a phrase length determination engine configured to determine a difference between a length of a phrase of object words associated with the at least one embedded natural language and a length of a phrase associated with the target natural language that corresponds to a candidate translation of the phrase of object words,
   wherein the embedded phrase translator engine is configured to translate the at least one embedded word phrase to the target natural language, based on the difference between the length of the phrase of object words associated with the at least one embedded natural language and the length of the phrase associated with the target natural language that corresponds to the candidate translation of the phrase of object words.

7. The system of claim 1, further comprising:
   a parsing engine configured to recognize each of the plurality of object words as a token, wherein the language determination engine is configured to identify a determined natural language associated with each word recognized by the parsing engine.

8. The system of claim 7, wherein:
   the determined natural language includes one of the at least one embedded natural language and the first natural language.

9. The system of claim 7, wherein:
   the language determination engine is configured to determine the first natural language and the at least one embedded natural language, based on a received user input specifying the first natural language and the at least one embedded natural language.

10. The system of claim 7, wherein:
    the language determination engine is configured to determine the first natural language and the at least one embedded natural language, based on a language analysis of at least one of the object words recognized by the parsing engine.

11. A computer program product comprising a hardware machine readable storage device storing executable code that, when executed, causes at least one data processing apparatus to:
    receive a communication object including a plurality of object words arranged in sequence;
    parse the communication object to identify each of the object words as tokens;
    identify at least one of the tokens as an embedded transliterated word that includes a transliterated character string associated with a first natural language;
    identify at least another one of the tokens as a non-transliterated word;
    convert the embedded transliterated word to a corresponding non-transliterated character string representation based on a script representation associated with the first natural language;
    determine the first natural language and at least one embedded natural language different from the first natural language, that are associated with the plurality of object words; and
    translate tokens associated with the first natural language and tokens included in embedded word phrases associated with the at least one embedded natural language to a target sequence of words associated with a target natural language, based on a difference between a length of a phrase of object words associated with one of the at least one embedded natural language and a length of a phrase associated with the target natural language that corresponds to a candidate translation of the phrase of object words.

12. The computer program product of claim 11, wherein the executable code, when executed, causes the at least one data processing apparatus to:
generate a combination of a translation model probability value and a language model probability value that are each associated with the communication object; and
translate the tokens associated with the first natural language and the tokens included in embedded word phrases associated with the at least one embedded natural language to the target sequence of words associated with the target natural language, based on at least one context associated with the communication object.

13. The computer program product of claim 12, wherein the executable code, when executed, causes the at least one data processing apparatus to:
translate the tokens associated with the first natural language and the tokens included in embedded word phrases associated with the at least one embedded natural language to the target sequence of words associated with the target natural language, based on at least one translation function of attributes associated with candidate translational phrases associated with the communication object.

14. The computer program product of claim 12, wherein the executable code, when executed, causes the at least one data processing apparatus to:
translate the tokens associated with the first natural language and the tokens included in embedded word phrases associated with the at least one embedded natural language to the target sequence of words associated with the target natural language, based on one or more of:
the combination of the translation model probability value and the language model probability value that are associated with candidate translational phrases associated with the communication object, or
a length of a candidate translation of the group of the object words.

15. The computer program product of claim 12, wherein:
the target natural language includes one of the at least one embedded natural language and the first natural language.

16. A method comprising:
receiving a communication object including a plurality of object words;
parsing the communication object to identify each of the object words as tokens;
determining a first natural language and at least one embedded natural language different from the first natural language that are associated with the plurality of object words, based on a language analysis of the tokens; and
translating, via a translating device processor, tokens associated with the first natural language and tokens included in at least one embedded word phrase associated with the at least one embedded natural language to a target natural language, based on at least one context associated with the communication object, and based on determining a length of a translation.

17. The method of claim 16, further comprising:
determining at least one transliterated word included in the tokens, each transliterated word including a transliterated character string; and
converting the at least one transliterated word to a non-transliterated script representation associated with one of the at least one embedded natural language, the first natural language, and the target natural language.

18. The method of claim 16, wherein:
translating the tokens includes translating, via the translating device processor, the tokens associated with the first natural language and the tokens included in embedded word phrases associated with the at least one embedded natural language to a target natural language object, based on at least one translation function of attributes associated with candidate translational phrases associated with the communication object to generate a ranked list of candidate translation phrases.

19. The method of claim 16, wherein:
translating the tokens includes translating, via the translating device processor, the tokens associated with the first natural language and the tokens included in the at least one embedded word phrase associated with the at least one embedded natural language to the target natural language object, based on one or more of:
combining a translation model probability value and a language model probability value that are each associated with the communication object, the combining including multiplying the translation model probability value by the language model probability value that are each associated with the communication object, or
determining a difference between a length of a phrase of object words associated with the at least one embedded natural language and a length of a phrase associated with the target natural language that corresponds to a candidate translation of the phrase of object words.

20. The method of claim 16, wherein:
the target natural language is determined based on a received user input specifying the target natural language.

* * * * *